Patented June 14, 1932

1,862,594

UNITED STATES PATENT OFFICE

RICHARD HERZ, NORBERT STEIGER, AND FRITZ SCHULTE, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR MANUFACTURING HALOGEN ARYL-THIOGLYCOLLIC ACIDS

No Drawing. Application filed September 29, 1928, Serial No. 309,352, and in Germany October 22, 1927.

Our present invention relates to a new process for manufacturing halogen-aryl-thioglycollic acids by starting from primary aromatic amines having a free para-position. Our process consists in three phases, namely: (a), introducing a sulfocyanogen group into the para-position of primary aromatic amines by causing an inorganic sulfocyanic salt and a halogen to act on the amine according to the U. S. application Serial No. 130,770 of 1926 now Patent No. 1,790,097, (b), saponifying the sulfocyanic group to the mercaptan group which is then transformed into the thioglycollic acid by condensing it with monochloro-acetic acid, (c), replacing the amino-group by halogen according to Sandmeyer's reaction, in which process the sequence of phase (b) and (c) may be changed.

Our new process is especially suitable for the production of halogen-aryl-thioglycollic acids corresponding to the formula:

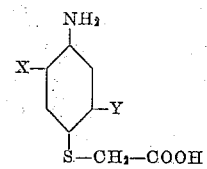

wherein X means hydrogen or an alkyl-group, Y halogen or an alkyl-group and Hal stands for a halogen atom. In this case our process probably proceeds according to the following formulæ:

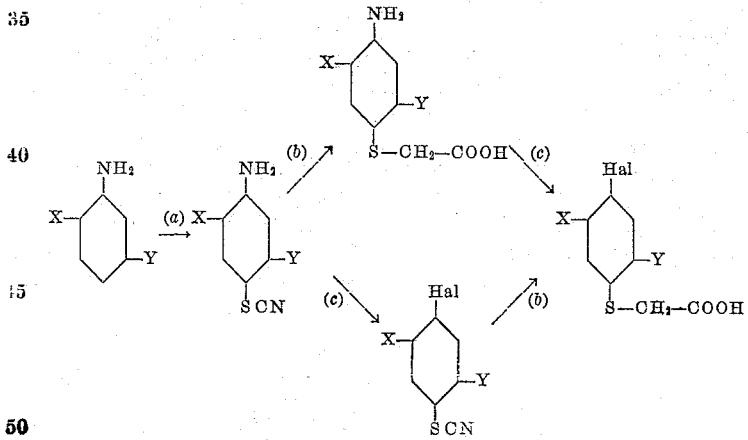

wherein X and Y have the aforesaid signification.

In this manner the halogen-aryl-thioglycollic acids are obtained in a satisfying yield and in a pure state. They are valuable starting materials for the manufacture of vat dyestuffs. The halogen-aryl-thioglycollic acids are already described in literature, but the corresponding amino-aryl-thioglycollic acids of the formula:

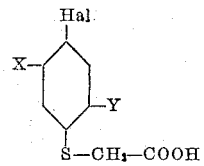

(wherein X and Y have the aforesaid signification), which acids are produced as intermediates according to phases (a) + (b) of our process, are unknown hitherto.

In order to further illustrate our invention the following examples are given, the parts being by weight and all temperatures in centigrade degrees, but we wish to be understood that our invention is not limited to the particular products or reaction conditions mentioned therein.

Example 1

A cooled solution of 100 parts of bromine in 220 parts of methyl alcohol is allowed to run into a cooled solution of 53.5 parts of meta-toluidine and 160 parts of sodium sulfocyanate in about 360 parts of methyl-alcohol whilst stirring. It is preferable to work at a temperature below 0° and to use a methyl alcohol, which is previously saturated with a suitable electrolyte, e. g. with potassium bromide, in order to preserve the solvent from the action of the halogen and the free sulfocyanogen. Without isolating the formed sulfocyanogen compound of the formula:

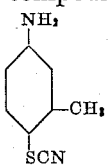

the reaction solution is poured into a solution of about 30 parts of sodium hydrosulfite in 250 parts of a caustic soda solution of 32° Bé. and about 700 parts of water. Then the mass is heated for a short time to about 60° and when the sulfocyanogen compound is completely saponified to the mercaptan compound, an alkaline solution of 50 parts of monochloro-acetic acid is added at about 30°. The condensation is finished by shortly warming the mass to 60°. Thereafter the methyl alcohol is distilled off and the remaining solution is cooled and carefully neutralized with a dilute acid. The 1-amino-3-methyl-phenyl-4-thioglycollic acid formed is advantageously precipitated from the neutral solution by means of acetic acid. It corresponds probably to the formula:

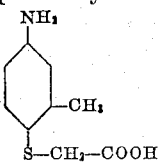

and crystallizes from water or colorless needles melting at about 172°. It is soluble in dilute mineral acids and dilute alkaline solutions and solutions of acetates.

In order to obtain the corresponding chloro-aryl-thioglycollic acid one may proceed as follows: The alkaline solution obtained as described above and containing the sodium salt of the aminomethyl-phenylthioglycollic acid is mixed with 35 parts of sodium nitrite and the mass is allowed to run into a mixture of 175 parts of hydrochloric acid of 1,16 specific gravity and ice. The diazo-solution thus prepared is poured into a warmed solution of 100 parts of cuprous chloride. With a strong evolution of nitrogen the 1-chloro-3-methyl-phenyl-4-thioglycollic acid separates. After cooling it is filtered by suction and washed with water. It probably corresponds to the formula:

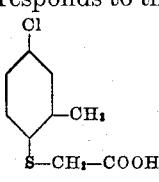

and melts when recrystallized from water or benzene at 127–129°.

*Example 2*

When in Example 1 the quantity of metatoluidine used is replaced by 70.5 parts of 1-methyl-2-amino-4-chlorobenzene and the process is carried out otherwise in the same way, 1-methyl-2-amino-4-chloro-phenyl-5-thioglycollic acid of the probable formula:

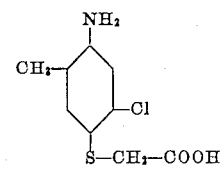

is obtained, crystallizing in rhombic leaflets, melting in a pure state at about 120° C., soluble in water and alcohol, in dilute mineral acids and dilute alkaline solutions and solutions of acetates. It is transformed according to Sandmeyer's reaction into the corresponding dichlorinated acid, which corresponds to the formula:

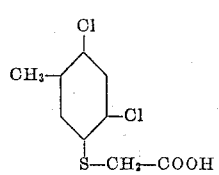

and melts at about 112°.

When starting from meta-chloroaniline and carrying out our process in the same way, the 2.4-dichloro-phenyl-1-thioglycollic acid is obtained.

*Example 3*

24.2 parts of para-xylidine and 50 parts of ammonium sulfocyanate are dissolved in 300 parts of methyl alcohol and into this solution a solution of 40 parts of bromine in 60 parts of methyl alcohol is allowed to drop in at about 15–20°. After stirring for about 1 hour the mass containing the sulfocyanogen compound is mixed with 16 parts of zinc dust, 110 parts of caustic soda solution 40° Bé. and 100 parts of water and heated to boiling on a reflux condenser, until the solution has become colorless and a sample taken from the solution remains clear, when diluted with water. Then the mercapto-solution is mixed with an alkaline solution of 20 parts of monochloro-acetic acid, stirred until the mercaptan reaction disappears, and the methyl alcohol is removed by distillation. By acidifying the solution the new 1.4-dimethyl-2-amino-5-thioglycollic acid of the probable formula:

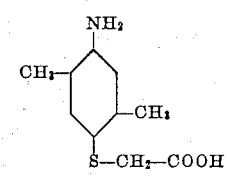

is isolated. It melts in a pure state at about 185°, it is soluble in dilute mineral acids and dilute alkaline solutions and solutions of acetates.

In order to obtain the corresponding chlorinated acid the above mentioned alkaline solution is diluted and mixed with 14 parts of sodium nitrite and then allowed to run into a mixture of hydrochloric acid and ice. The diazo solution thus obtained is mixed at about 50° with a solution of 40 parts of cuprous chloride. With an evolution of nitrogen the 1.4-dimethyl-2-chloro-phenyl-5-thioglycollic acid separates. It corresponds to the probable formula:

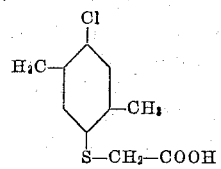

and melts at about 96°.

*Example 4*

A sulfocyanogen solution, prepared from 24.2 parts of para-xylidine as described in Example 3, is diluted with about 2000 parts of water and rendered weakly alkaline by means of soda. Thus the 1.4-dimethyl-2-amino-5-sulfocyanogen-benzene of the probable formula:

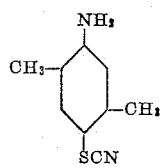

separates as an oil crystallizing when standing for a while. It is filtered by suction, dissolved in dilute hydrochloric acid and diazotized in the usual manner. The diazo-solution thus obtained is treated at 40° with a solution of 40 parts of cuprous chloride according to Sandmeyer's reaction.

In order to saponify the formed 1.4-dimethyl-2-chloro-5-sulfocyanogen-benzene of the formula:

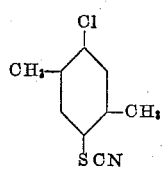

to the corresponding mercapto compound it is dissolved at 40–50° in a dilute caustic soda solution with the addition of a reducing agent such as hydrosulfite or zinc dust. Preferably some ethyl alcohol (say 10% of the reaction mass) is added. Then the mass is condensed with an alkaline solution of 20 parts of monochloro-acetic-acid. By acidifying the filtered solution 1.4-dimethyl-2-chloro-benzene-5-thioglycollic acid is obtained which acid is identical with that prepared according to Example 3.

We claim:

1. A process which comprises, (a), forming aromatic para-amino-sulfocyanic compounds by the action of a water and alcohol soluble inorganic sulfocyanic salt and bromine on primary aromatic amines having a free para-position, (b), saponifying the sulphocyanogen group to the mercapto group and transforming the latter into the thioglycollic acid by condensing it with monochloroacetic acid and, (c), replacing the amino-group by halogen according to Sandmeyer's reaction.

2. A process which comprises, (a), forming aromatic para-amino-sulfocyanic compounds of the general formula:

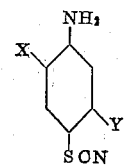

wherein X means hydrogen or an alkyl group and Y halogen or an alkyl group, by the action of a water and alcohol soluble inorganic sulfocyanic salt and bromine on primary aromatic amines of the general formula:

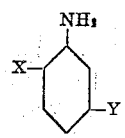

wherein X and Y have the aforesaid signification, having a free para-position, (b), saponifying the sulfocyanogen group to the mercapto group and transforming the latter into the thioglycollic acid by condensing it with monochloroacetic acid and, (c), replacing the amino group by halogen according to Sandmeyer's reaction.

3. A process which comprises acting with a water and alcohol soluble inorganic sulfocyanic salt and bromine on primary aromatic amines of the general formula

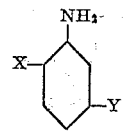

wherein X means hydrogen or an alkyl group and Y halogen or an alkyl group, treating the para-amino-sulfocyanogeno compounds of the general formula

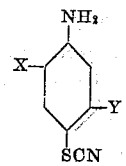

wherein X and Y have the aforesaid signification, thus obtained with saponifying agents, condensing the corresponding mercapto compounds formed with monochloroacetic acid and replacing in the amino-arylthioglycollic acids thus formed the amino-group by halogen according to Sandmeyer's reaction.

4. A process which comprises acting with a water and alcohol soluble inorganic sulfocyanic salt and bromine on meta-toluidin, treating the sulfocyanic compound formed of the formula

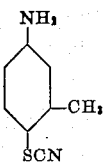

with saponifying agents, condensing the corresponding mercapto compound thus obtained with monochloroacetic acid and replacing in the amino-thioglycollic acid formed of the formula

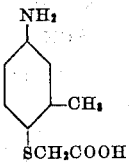

the amino-group by halogen according to Sandmeyer's reaction.

5. In the process for producing halogen-arylthioglycollic acids the manufacture of amino-arylthioglycollic acids which process comprises acting with a water and alcohol soluble inorganic sulfocyanic salt and bromine on primary amines of the general formula

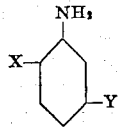

wherein X means hydrogen or an alkyl group and Y halogen or an alkyl group, treating the para-amino-sulfocyanogeno compounds of the general formula

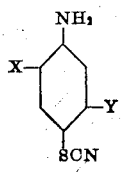

wherein X and Y have the aforesaid signification, thus obtained with saponifying agents and condensing the corresponding mercapto-compounds formed with monochloroacetic acid.

6. As new compounds amino-aryl-thioglycollic acids of the general formula

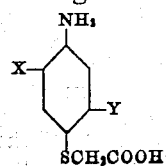

wherein X means hydrogen or an alkyl group and Y halogen or an alkyl group, which compounds are colorless crystalline substances, soluble in dilute mineral acids and in dilute alkaline solutions and solutions of acetates.

7. As a new compound the 1-methyl-2-amino-4-chlorophenyl-5-thiogylcollic acid of the formula

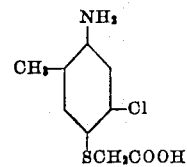

melting in a pure state at about 120°, soluble in water and alcohol and soluble in dilute mineral acids and dilute alkaline solutions and solutions of acetates.

In testimony whereof, we affix our signatures.

RICHARD HERZ.
NORBERT STEIGER.
FRITZ SCHULTE.